May 1, 1923.

W. J. SMITH

AUTOMOBILE LOCK

Filed Oct. 21, 1921

1,453,531

2 Sheets-Sheet 1

Inventor
William J. Smith
By his Attorney
Clarence G. Campbell.

May 1, 1923.

W. J. SMITH

AUTOMOBILE LOCK

Filed Oct. 21, 1921

1,453,531

2 Sheets-Sheet 2

Inventor
William J. Smith
By his Attorney
Clarence G. Campbell

Patented May 1, 1923.

1,453,531

UNITED STATES PATENT OFFICE.

WILLIAM J. SMITH, OF NEW YORK, N. Y., ASSIGNOR OF ONE-FOURTH TO JEROME S. RAWSON AND ONE-FOURTH TO JAMES A. H. COLGAN, BOTH OF NEW YORK, N. Y.

AUTOMOBILE LOCK.

Application filed October 21, 1921. Serial No. 509,266.

*To all whom it may concern:*

Be it known that I, WILLIAM J. SMITH, a citizen of the United States, residing at 477 West 22d Street, in the borough of Manhattan, in the county of New York, city and State of New York, have invented certain new and useful Improvements in Automobile Locks, of which the following is a specification.

This invention relates to automobile locks, and the novelty consists in the construction and arrangement of the parts, as will be more fully hereinafter pointed out.

The number of automobiles stolen has increased each year with the increase in the popularity of the automobile, but at a much more rapid rate. Therefore, the problem of preventing such stealings has become more and more difficult, as the police force is not sufficient in any district to meet the situation.

It has therefore become imperative for automobile owners to adopt the use of some form of lock which can be readily locked and unlocked and used whenever the car is not being operated.

My lock furnishes such a device which can be locked and unlocked easily and quickly, and which cannot without great difficulty and unusual labor be removed by one who does not have the key in his possession.

Furthermore, my device positively locks the steering wheel, which is an essential portion of the car that cannot be eliminated in the operation of the car, so that one attempting to steal the car with my lock in position cannot do so without rigging some new steering device, which is absolutely impractical because of the time and labor involved, and for most thieves is impossible.

Figure 1:
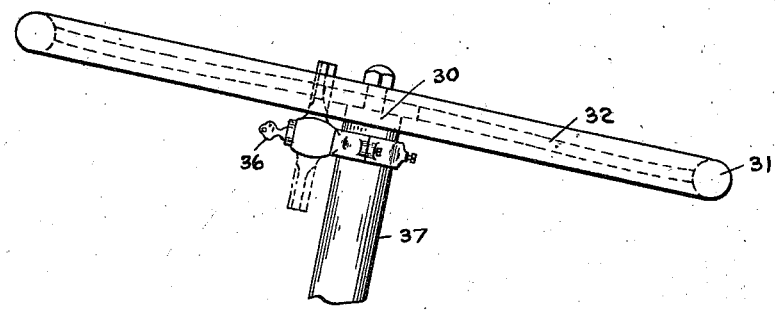
Figures 2, 3:
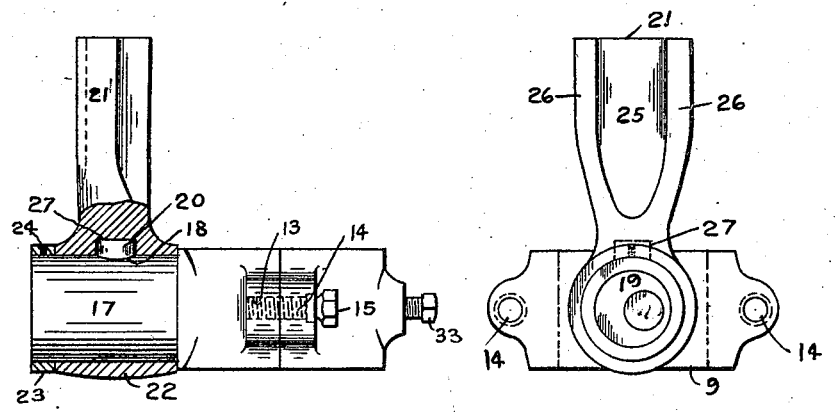
Figure 4:
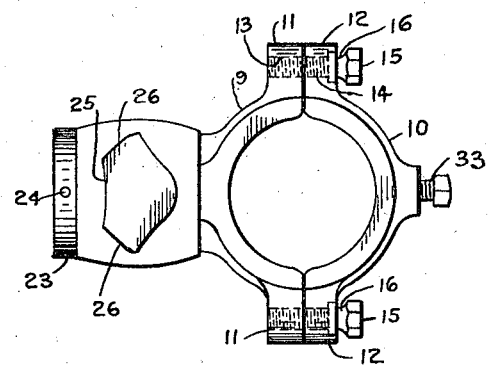
Figure 5:
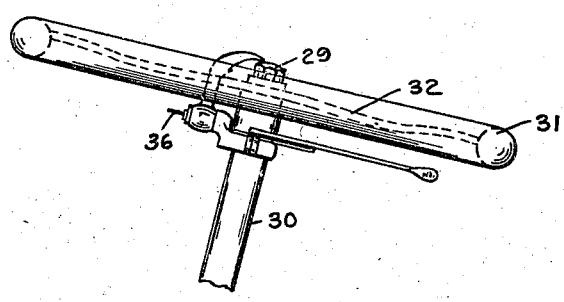
Figure 6:
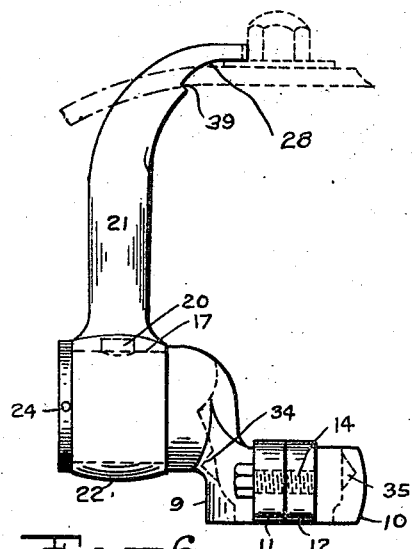
Figure 7:
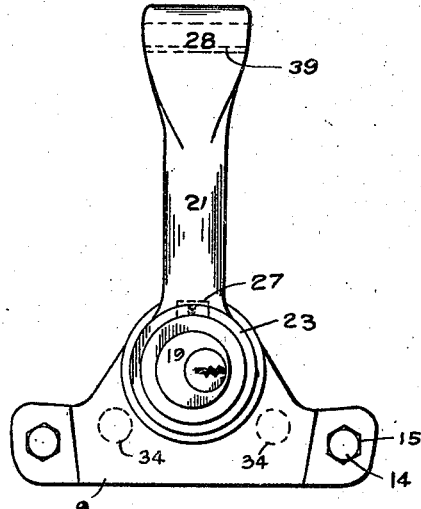
Figure 8:
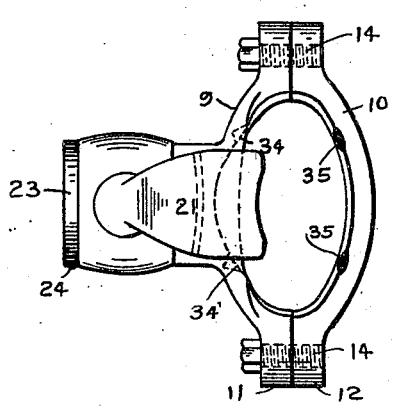

Referring to the drawings, Figure 1 is a perspective of a steering post head and wheel with my lock attached and the key in position for use; Figure 2 is a side view of my device with a portion broken away in order to show the operating parts; Figure 3 is a front elevation of my device; Figure 4 is a top plan view of my device; Figure 5 is a perspective of another form of my device mounted on the head of a steering post and wheel with the key in position for use; Figure 6 is a side view of the form of device shown in Figure 5 with a portion of steering post and wheel in dotted outline; Figure 7 is a front elevation of the form of my device shown in Figure 5; and Figure 8 is a top plan view of the form of my device shown in Figure 5.

In the drawings 9 is a main clamp member to which is adapted to be clamped a secondary clamp member 10, both members 9 and 10 having a pair of ears 11 and 12, respectively, which are internally threaded at 13 so as to receive locking bolts 14 which have heads 15, which are adapted to be turned off because of the use of a weakened neck member 16, so that the bolts 14 will be left in position holding the clamping members 9 and 10 securely together so that the bolts 14 are not removable and must be drilled out in order to separate the clamping members 9 and 10.

The main clamping member 9 has a hollow shaft 17 made integral therewith, and said shaft 17 has a hole 18 bored through the top thereof. A lock 19 is adapted to be mounted in said hollow shaft 17 so that a bolt 20 of said lock 19 projects through the hole 18 in the shaft 17.

A locking bar 21 has a cylindrical ring member 22 integral therewith which is adapted to slip over and rotate freely around the hollow shaft 17, and is retained in position on said shaft by means of a locking ring 23 which is rigidly secured to the shaft 17 by means of pin 24. The locking bar 21 has flattened faces 26 which are adapted to fit snugly against the spokes of the steering wheel, between which the locking bar 21 may be brought into position when locked so as to effect a rigid contact of the locking bar with the steering wheel. The locking bar 21 has an inside cut-out portion 27 which is adapted to receive the locking bolt 20 of the lock 19, so as to rigidly lock the locking bar 21 to the shaft 17, in an upright position.

Another form of my device is shown in Figures 5, 6, 7 and 8, which has all of the same elements arranged for the same purpose as in the device shown in Figures 1, 2, 3 and 4, with the exception of the form of the locking bar which has a curved upper portion 28 terminating in a curved lip 38 which is adapted to lock into position so as to rest against and retain in a non-removable position a retaining nut 29 at the head of a steering post 30, on which is a steering wheel 31 of usual construction with spokes 32, and over said post 30 is a steering post housing 37 of usual construction. The curved upper portion 28 also has a shoulder 39 which is adapted to fit snugly against the wheel 31 in the angle between any two of the spoke 32.

The clamping member 10 also carries a set screw 33 which is adapted to be used for fixing the clamp members 9 and 10 in a fixed position on the post 30 when necessary.

In Figures 5, 6, 7 and 8 the clamp members 9 and 10 are made in slightly different form and have cut-out portions 34 and 35, respectively, adapted to fit the particular head portions of certain types of steering post housing so as to clamp over the heads of projecting members thereon, thereby effecting a more perfect clamping so as to prevent any turning of said clamping members 9 and 10.

In mounting my device for use it is merely necessary to fit the clamp members 9 and 10 over the steering post housing 37 under the steering wheel 31 in the desired position and turn down the bolts 14 until the heads 15 are turned off, and if necessary also screw down the set screw 33 so as to hold the clamping members 9 and 10 in a fixed position on the housing 37. The locking bar 21 will then hang when not in use in the unlocked or suspended position shown in Fig. 1 in dotted outline, and when it is desired to throw this locking bar up into the locked position the wheel 31 must be turned sufficiently so that the bar 21 will come up between any two of the spokes 32 until it has reached the upright position when the bolt 20 of the lock 19 will snap into its locked engagement in the cut-out 27 of the locking bar 21, thereby locking it in fixed rigid position to the shaft 17 so that the faces 25 and 26 of the locking bar 21 are in contact with the head of the steering post 30 and the spokes 32 of the wheel 31, thereby preventing the turning of said wheel 31 in either direction. To throw the locking arm 21 out of its locked position a key 36 should be inserted in the lock 19 and turned in the usual way so as to release the bolt 20 from the cut-out portion 27, whereupon the wheel 31 may be turned, thereby swinging the locking arm 21 around until it is free from the spokes 32, whereupon it will fall into the unlocked position shown in dotted outline in Figure 1 where it hangs ready for use whenever desired.

I claim:

1. In an automobile lock a steering post housing clamp having a shaft integral therewith in which is rigidly mounted a lock so that the bolt of said lock projects through the top of said shaft when mounted in position, a locking bar mounted on said shaft so that it rotates freely thereon, and a cut-out in said bar adapted to receive said bolt and lock said bar rigidly in the upright position.

2. In an automobile lock a clamp adapted to be secured over a steering post housing having a shaft integral therewith in which is rigidly mounted a lock so that the bolt of said lock projects through the top of said shaft when mounted in position, a locking bar mounted on said shaft so that it rotates freely thereon, and a cut-out in said bar adapted to receive said bolt and lock said bar rigidly in position in the angle formed by any two spokes of a steering wheel.

3. In an automobile lock a steering post housing clamp having a shaft integral therewith in which is rigidly mounted a lock so that the bolt of said lock projects through the top of said shaft when mounted in position, a locking bar mounted on said shaft so that it rotates freely thereon and having a head portion adapted to fit the angle formed by any two spokes of a steering wheel, and a cut-out in said bar adapted to receive said bolt and lock said bar rigidly in the upright position.

4. In an automobile lock a steering post housing clamp having a shaft integral therewith in which is rigidly mounted a lock so that the bolt of said lock projects through the top of said shaft when mounted in position, a locking bar mounted on said shaft so that it rotates freely thereon and having a head adapted to fit over the retaining nut on the head of a steering post, and a cut-out in said bar adapted to receive said bolt and lock said bar rigidly in the upright position.

5. In an automobile lock a steering post housing clamp having a shaft integral therewith in which is rigidly mounted a lock so that the bolt of said lock projects through the top of said shaft when mounted in position, a locking bar mounted on said shaft so that it rotates freely thereon and having a head adapted to fit over the retaining nut on the head of a steering post, and a cut-out in said bar adapted to receive said bolt and lock said bar rigidly in the upright position in the angle formed by any two spokes of a steering wheel.

6. In an automobile lock the combination of a steering post housing clamp, a shaft integral therewith, a lock rigidly mounted in said shaft, a locking bar mounted so as to rotate freely on said shaft and having a head portion adapted to fit the angle formed by any two spokes of a steering wheel and adapted to be locked to said shaft in the upright position in the angle formed by any two spokes of a steering wheel.

7. In an automobile lock the combination of a steering post housing clamp, a shaft integral therewith, a lock rigidly mounted in said shaft, a locking bar mounted so as to rotate freely on said shaft and having a head portion adapted to fit over a retaining nut on the head of a steering post, and said bar also being adapted to be locked to said shaft in the upright position.

8. In an automobile lock the combination of a steering post housing clamp, a shaft integral therewith, a locking bar mounted so as to rotate freely in a vertical plane parallel to the steering post on said shaft and having a head portion adapted to fit the angle formed by any two spokes of the steering wheel, and means for locking said locking bar in a vertical position with respect to said shaft.

In testimony whereof I affix my signature.

WILLIAM J. SMITH.